United States Patent [19]
Horiike et al.

[11] Patent Number: 5,369,598
[45] Date of Patent: Nov. 29, 1994

[54] FLOW AMOUNT MEASURING AND CONTROLLING APPARATUS

[75] Inventors: Yoshio Horiike, Katano; Tohru Atsumi, Gojo; Hirokuni Murakami; Takashi Uno, both of Nara, all of Japan

[73] Assignee: Matsushita Electric Industrial Co., Ltd., Osaka, Japan

[21] Appl. No.: 848,403

[22] Filed: Mar. 6, 1992

[30] Foreign Application Priority Data

Apr. 4, 1991 [JP] Japan .................................. 3-071564
Aug. 6, 1991 [JP] Japan .................................. 3-196453
Oct. 21, 1991 [JP] Japan .................................. 3-272302

[51] Int. Cl.$^5$ .......................... G01F 1/12; G06F 15/46
[52] U.S. Cl. ................................ 364/510; 364/571.01; 340/609
[58] Field of Search ............... 364/509, 510, 571.01, 364/571.02, 571.04, 571.05; 377/2, 15, 16, 21; 73/195, 196; 340/606, 609, 632, 310 R

[56] References Cited

U.S. PATENT DOCUMENTS

| | | | |
|---|---|---|---|
| 4,530,247 | 7/1985 | Haas | 73/861 |
| 4,885,943 | 12/1989 | Tootell et al. | 73/861.77 |
| 4,953,386 | 9/1990 | Pearman et al. | 73/3 |
| 4,969,365 | 11/1990 | StrigÅrd et al. | 73/861.77 |
| 5,126,934 | 6/1992 | MacFadyen | 364/140 |

FOREIGN PATENT DOCUMENTS

| | | |
|---|---|---|
| 0264856A3 | 4/1988 | European Pat. Off. |
| 0385501A3 | 5/1990 | European Pat. Off. |
| 1182786 | 3/1970 | United Kingdom |
| 2176643A | 12/1986 | United Kingdom |

Primary Examiner—Thomas G. Black
Assistant Examiner—Michael Zanelli
Attorney, Agent, or Firm—Wenderoth, Lind & Ponack

[57] ABSTRACT

A flow amount measuring and controlling apparatus which has a built-in gas meter can compute and control the flow amount used for each gas appliance by the estimation of the gas appliance generated in the flow variation from the change of the monetary flow amount passing through the gas meter, whereby, since the condition of the gas appliance can be correctly determined, the abnormal operation of the gas appliance can be detected so as to shut off the gas.

15 Claims, 9 Drawing Sheets

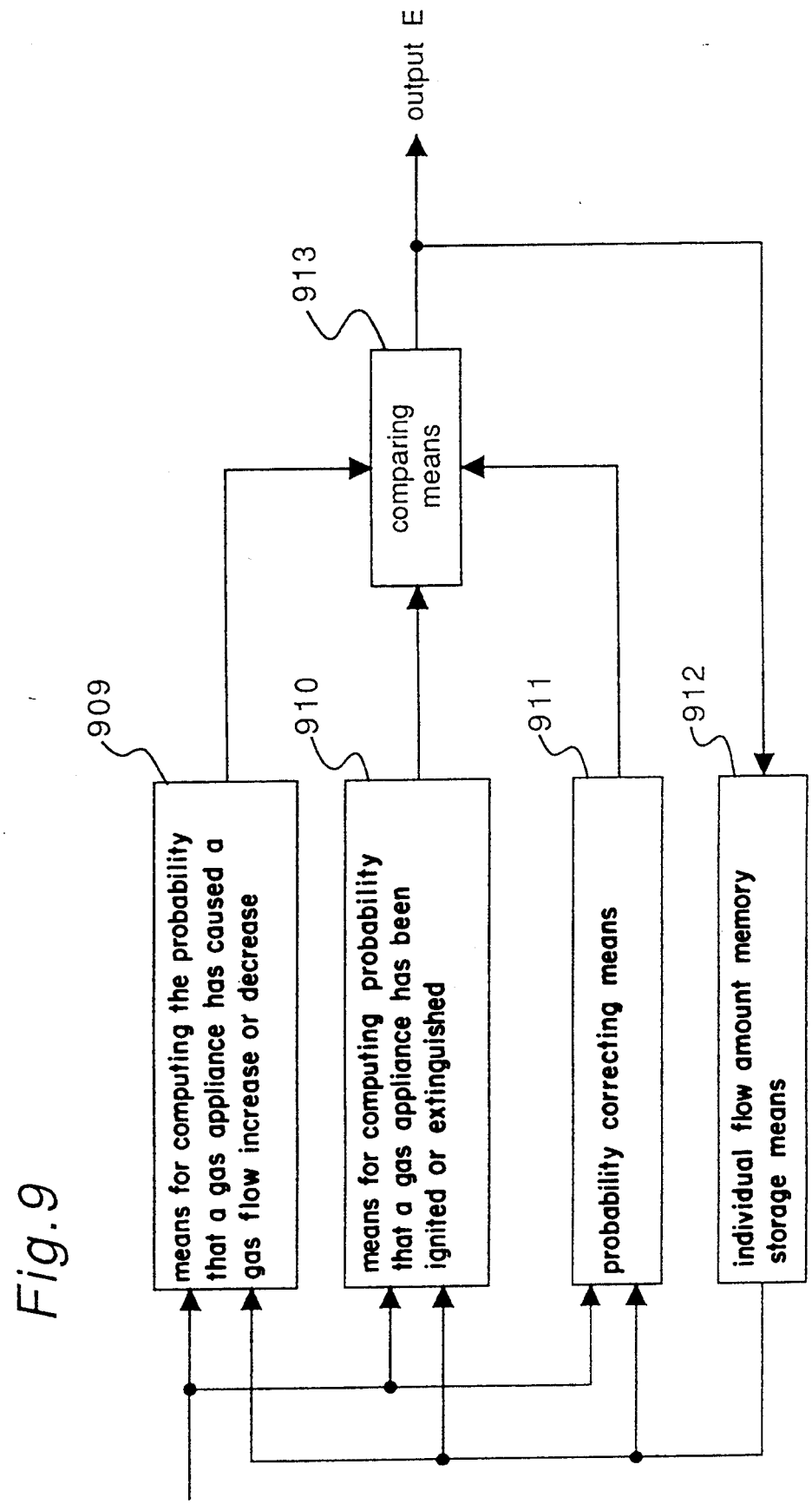

Fig. 10 (1)
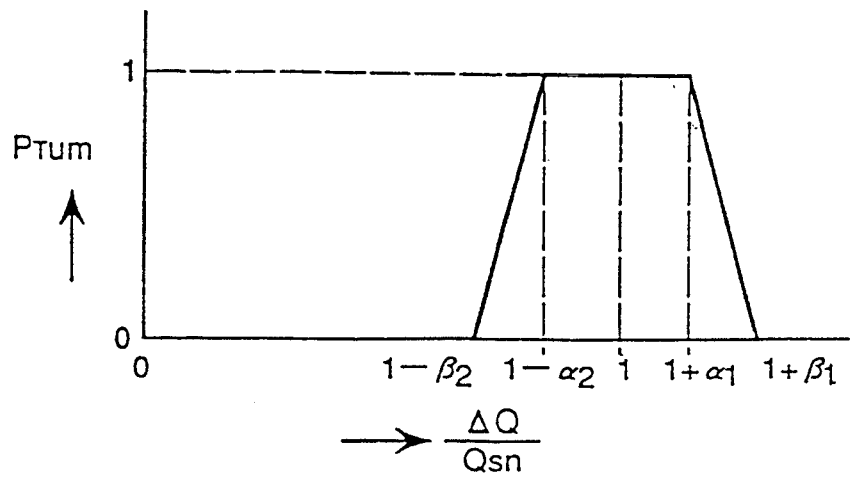
Fig. 10 (2)
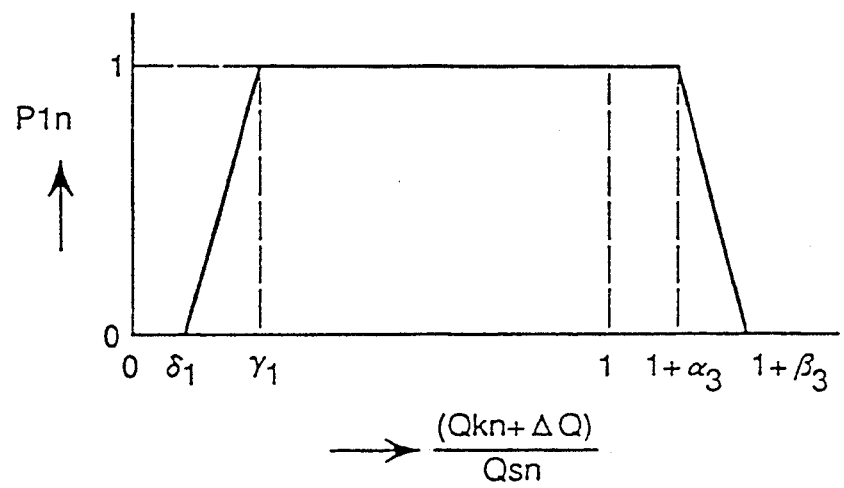
Fig. 10 (3)
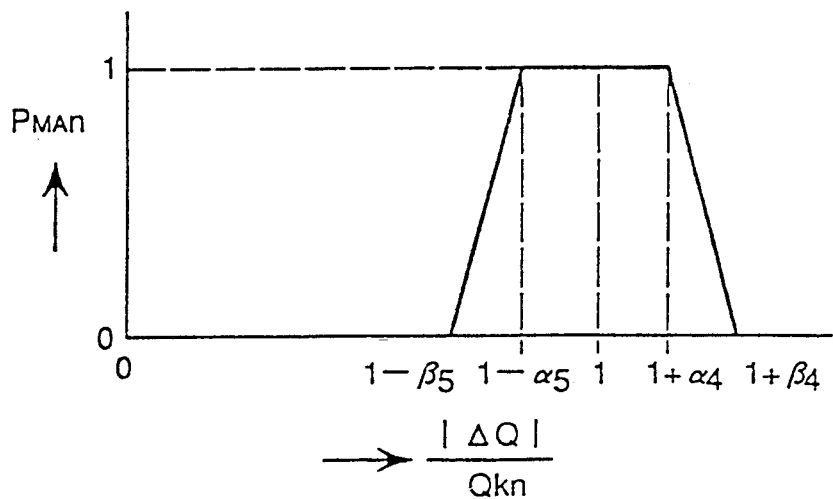

FLOW AMOUNT MEASURING AND CONTROLLING APPARATUS

BACKGROUND OF THE INVENTION

The present invention generally relates to a flow amount measuring and controlling apparatus to be included in a gas meter. The amount of gas flow is observed so as to estimate what type of gas appliance is being used from the changes in the amount of gas flow so that the gas may be shut off when the gas appliance has been judged to be used in an abnormal way.

In order to prevent a gas explosion accident, gas meters have recently been utilized which have microcomputers built in, and have a function of shutting off the gas when gas appliances are judged to be abnormally used and raw gas is judged to be released, from the changes in amount of gas flow. Such a conventional gas meter with a safety function attached to it detects changes in the amount of gas flow passing through the gas meter, so as to recognize whether a gas appliance of a capacity equivalent to the size of the change has been ignited or put out. The gas supply is adapted to be shut off when the above described gas appliance has been continuously used beyond a maximum time which is previously set in accordance with the capacity of the recognized gas appliance.

But such a conventional gas meter with a safety function attached to it has a problem shown hereinafter. A modern gas appliance has not only two changes of ignition/extinction, but also continuous changes in the amount of flow during use in accordance with the situation, for example, when a gas fan heater is used to raise the ambient temperature, the combustion amount of the gas fan heater gradually becomes lower as the ambient temperature rises. When the amount of gas flow of a first gas appliance has been reduced during use, the conventional gas meter with a safety function attached to it recognizes the changes in the amount of flow as the extinction of the above described first gas appliance and the ignition of a second gas appliance of a smaller capacity. When the amount of gas flow of the above described first gas fitting has been increased during its use, a third gas fitting equivalent in capacity to the increase in the amount of flow is recognized to have been ignited. As a result, in spite of the fact that a first gas appliance is actually burning with a large amount of gas flow, the gas meter recognizes two gas appliances, the second and third gas appliances of a smaller capacity, as being used. The maximum time for the continuous use of the first gas fitting is elongated, with problems in that the dangers forgetting to turn off gas appliances and raw gas releasing, cannot be prevented. A gas hot water heater with a larger combustion capacity to be set outdoors is used for various applications such as a bath, a shower, dishwashing in a kitchen, and so on. It is often used continuously more than one hour. In such an appliance to be set outdoors, the maximum time of continuous use may be desired to be set especially longer, differently from indoor appliances. This kind of use can be settled without problem if the type of the gas appliance in use at the present time can be recognized correctly.

The power demand is recently increased at summer time by the spread of air conditioner using electric power; this results in insufficient power supply capacity. On the other hand, the gas demand is likely to be reduced at summer time. Therefore, there is a tendency of easing the power demand by the spread of air conditioners using gas, and at the same time, of averaging the demand of the gas annually. Thus, a rate policy which makes the gas rate lower in accordance with the amount of gas used for air conditioners has been considered. In order to effect such a rate policy for each appliance, an auxiliary gas meter for measuring the amount of gas flow of the gas air-conditioner is necessary in addition to the main gas meter. The expenditure for the auxiliary gas meter, the expenditures and so on for mounting the auxiliary gas meter onto the gas piping are required. If the type of gas appliances now in use with the main gas meter can be correctly recognized and the amount of gas used can be correctly integrated, a rate policy for each appliance can be realized only by the main gas meter.

SUMMARY OF THE INVENTION

Accordingly, the present invention has been developed with a view to substantially eliminating the above discussed drawbacks inherent in the prior art, and has for its essential object to provide a flow amount measuring apparatus.

Another important object of the present invention is to provide a flow amount measuring apparatus which can recognize which gas appliance is now being used by the monitoring operation of the amount of gas flow passing through a gas meter and can integrate the amount of gas flow used for each appliance.

In accomplishing these and other objects, according to one preferred embodiment of the present invention, there is provided a flow amount measuring apparatus which has information stored in advance such as rising flow amount information at the ignition time of various gas appliances, information of the flow amount capacity of the various types of gas appliances, information as to whether or not the appliances in use change their amount of gas flow during use, besides during the time of ignition/extinction, information about change of the amount of gas flow with respect to the time passing from the ignition of the various types of gas appliances, and so on. When the amount of gas flow passing through the gas meter changes, comparisons are effected among the respective types of information, actually measured gas flow amount values, changes in the gas flow amount, and time periods required to change. From the above information the gas appliance now ignited/extinguished or an increased flow amount is assumed. By using the maximum possibility of the gas appliance which made the gas flow change, the appliance recognition capacity is increased remarkably as compared with the conventional apparatus.

In the present invention, as the above described, the respective types of information stored in advance is automatically learned by changes in the amount of gas flow passing through the gas meter, and all of the respective types of information are not required to be inputted by an operator. Therefore, the bother at the gas meter installation time can be saved.

A gas meter, with a safety function attached to it, which is capable of evading dangerous conditions such as a gas appliance not turning off, or raw gas being released and so on, can be realized by the use of the present invention.

The present invention can realize a rate policy for each appliance simply with one gas meter.

BRIEF DESCRIPTION OF THE DRAWINGS

FIG. 9 is a block diagram of the individual flow amount estimating means; and

FIGS. 10(1)–10(3) are charts comparing various functions with various gas flow amounts.

DETAILED DESCRIPTION OF THE INVENTION

Figure 1:
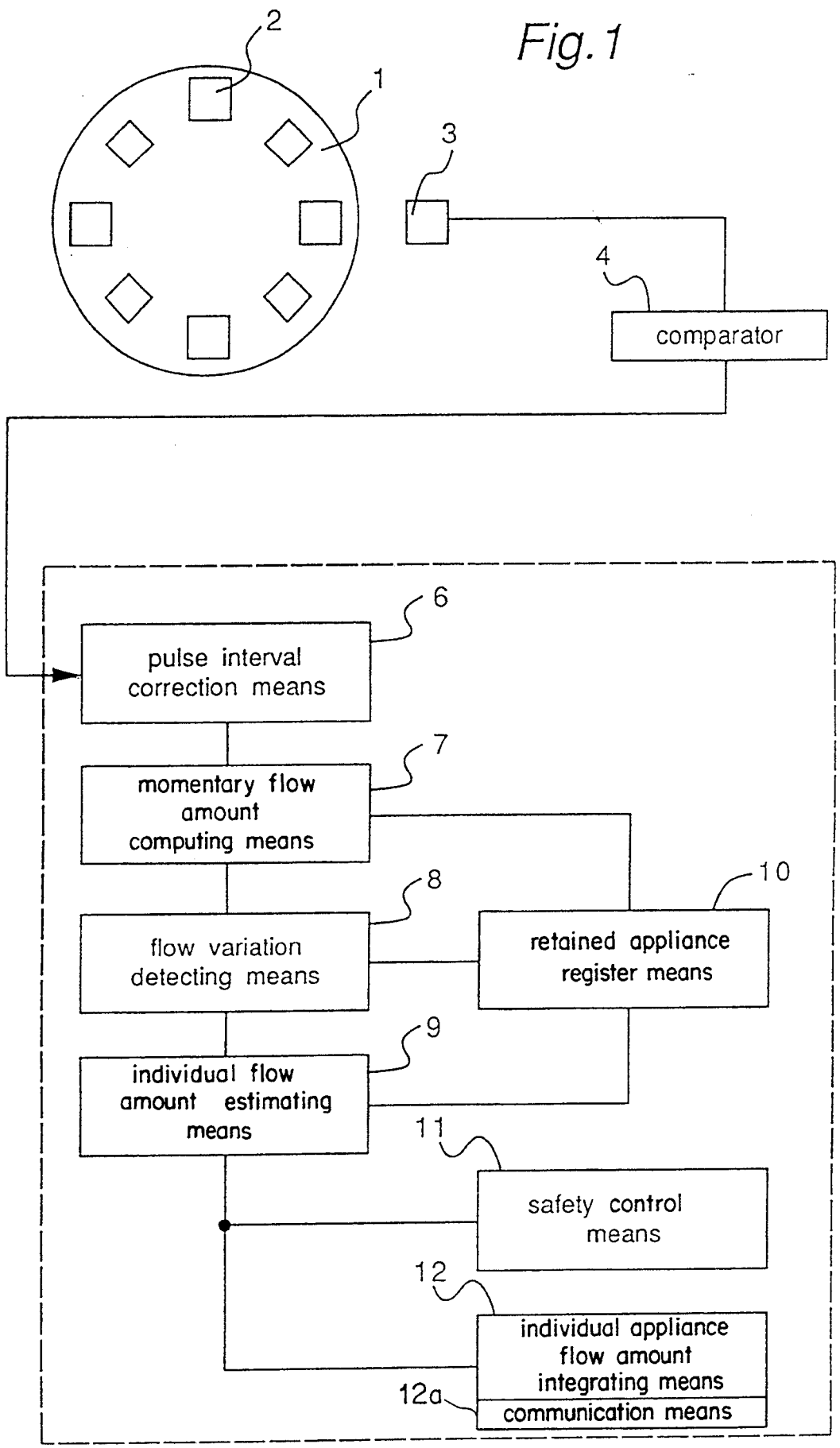
FIG. 1 is a system block diagram of a flow amount measuring apparatus in accordance with one embodiment of the present invention.

FIG. 1 is a system block diagram of a flow amount measuring apparatus in accordance with one embodiment of the present invention. In the drawing, reference numeral 1 is a disc for effecting one rotation through an interlocking operation with one round trip of the film of a film type gas meter; reference numeral 2 is a plurality of magnets (which are assumed to be with in the present embodiment) disposed on the disc 1; reference numeral 3 is a magnetic resistance element fixedly secured near the disc 1 so as to detect the change in the magnetic field; reference numeral 4 is a comparator for converting the outputs of the magnetic resistance element 3 into pulses.

Reference numeral 6 is a pulse interval correcting means for correcting the pulse intervals of the pulse signals from the comparator 4. Reference numeral 7 is a momentary flow amount computing means for calculating the flow amount per unit time from the duty cycle of the pulse signal from the pulse interval correcting means 6. Reference numeral 8 is a flow variation detecting means for detecting the size of the flow variation and the continuous time of the flow variation by the information from the momentary flow amount computing means 7. Reference numeral 9 is an individual flow amount estimating means which estimates the gas appliance which made gas flow change by comparing the information from the flow variation detecting means 8 with the characteristic information of each gas appliance in use that are stored in the individual flow amount estimating means 9 itself, and with the gas flow amount information of the gas appliance in use and the household retains which is registered in the retained appliance register means 10. The retained appliance register means 10 detects a condition when a momentary flow amount does not exist, namely, a condition where no gas appliance is used, and recognizes the ignition of the gas appliance and the maximum rising flow amount at the ignition time by the information from the flow variation detecting means 8, and then registers the maximum ignition flow amount of the ignited gas fitting. Reference numeral 11 is a safety control means, which stores the maximum time for which each gas appliance can be operated continuously and safely. By the flow amount information of the gas appliance from the individual estimating means 9, the safety control means 11 judges that a case where a certain gas appliance is continuously used beyond the above maximum time is an abnormal use such as the gas appliance not turning off or the like so as to shut off the gas. Reference numeral 12 is an integrating means for each appliance which integrates and displays the flow amount for each gas appliance by the information from the individual flow amount estimating means 9. The flow amount integrating means 12 for each appliance has a communication means 12a for communicating with the outside so as to transmit to the outside the integrating values for each appliance. Reference numeral 13 is a flow amount measuring and controlling apparatus of the present invention.

Figure 2:
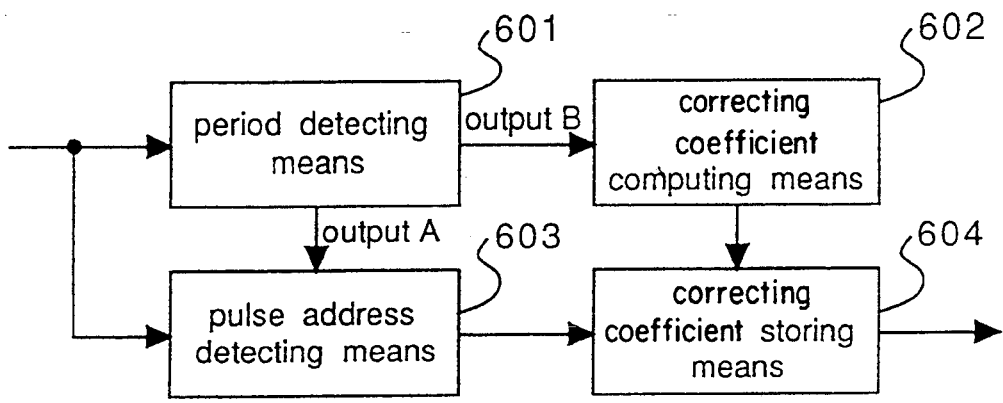
FIGS. 2, 3 and 4 are block diagrams of pulse interval correcting means which are elements of a flow amount measuring apparatus of the present invention.
Figure 3:
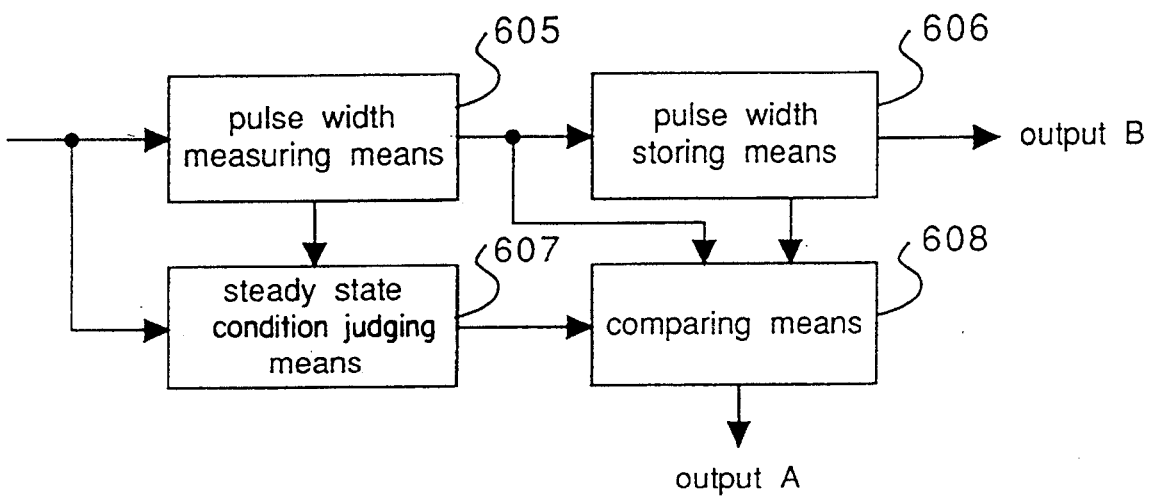
Figure 4:
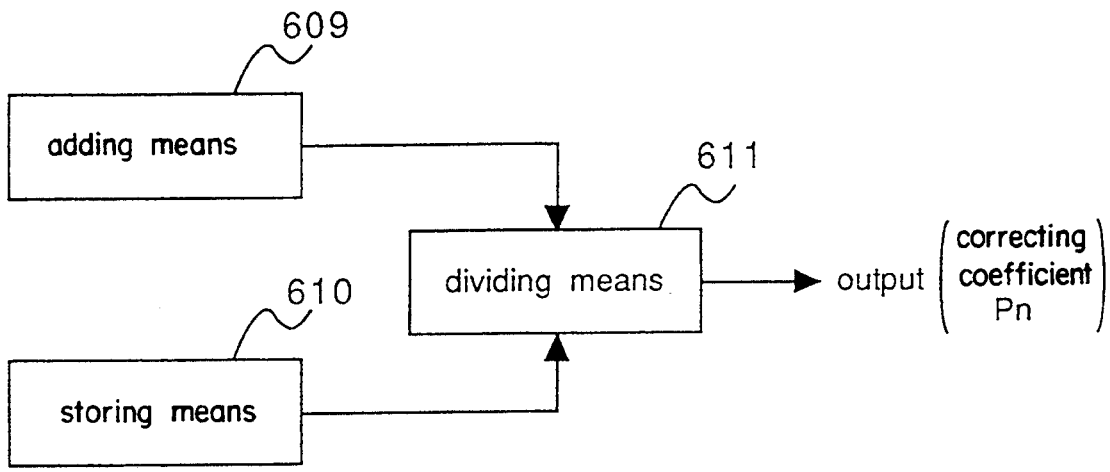

A film type gas meter is adapted to convert the reciprocating motion in a linear direction of the film by the gas pressure into the rotating motion of the disc. As its characteristic, even if gas flow is constant, the disc 1 does not rotate at a constant angular speed. Therefore, the pulse output from the comparator 4 does not become a pulse output of equal intervals even if magnets 2 are disposed at equal intervals on the disc 1. If the momentary flow amount is calculated under the pulse output, the correct momentary flow amount and an error are caused. The pulse interval correcting means 6 corrects any inequality of the above described pulse interval caused by the characteristic of the film type gas meter. A block diagram of the pulse interval correcting means 6 is shown in FIG. 2. The pulse signals from the comparator 4 are input to a period detecting means 601 and to a pulse number detecting means 603. Eight pulses are caused respectively for one rotation of the disc 1. Reference pulses are identified from each series of eight pulses which are input to the period detecting means 601 so as to transmit the reference pulse information to the pulse number detecting means 603. The pulse which has a maximum pulse width of, for example, eight pulses is detected as the reference pulse. In the correcting coefficient computing means 602, eight signals of one period of series are taken in from the period detecting means 601 so as to measure the respective eight pulse widths for determining the correcting coefficients. The eight correcting coefficients for each eight pulses are transmitted to a correcting coefficient storing means 604. One embodiment of the construction of the period detecting means 601 is shown in FIG. 3. In the same drawing, reference numeral 605 is a pulse width measuring means; reference numeral 606 is a pulse width storing means; reference numeral 607 is a steady state condition judging means and reference numeral 608 is a comparing means. The pulse time width of the pulse signals from the comparator 4 are measured by the pulse width measuring means 605. The pulse time width of eight pulses for one rotation of the disc 1 is stored in the pulse width storing means 606. In the steady state condition judging means 607, the meter judges whether or not the gas is flowing constantly. When the gas is flowing constantly, the comparing means 608 is operated. In the judgment as to whether or not the gas is flowing constantly, for example, one signal is output for each divided eight pulses, and if the periods of the above conversion signals output are constant, it can be judged that the gas is flowing constantly. Also, in another method, it can be judged that gas flows constantly if the pulse width on every eighth pulse are equal. In the comparing means 608, the eight pulse widths stored in the pulse width storing means 606 are compared by size so as to take out the maximum pulse width for comparing the pulse width existing at the present time point to be input from the pulse width measuring means 605 with the above described maximum pulse width. If the two pulse widths are equal, the pulse input at the present time point is regarded as a reference pulse. When the reference pulse is input, the comparing means 608 outputs output A so that the count value of the pulse number detecting means 603 of FIG. 2 becomes 0. Eight pulse width information of one period of pulses stored in the pulse width storing means 606 is output in order from the reference pulse with respect to the correcting coefficient computing means 602 of FIG. 2. One embodiment of the construction for the correcting coefficient computing means 602 will be described with reference to FIG. 4. A correcting coefficient computing method will be described hereinafter.

Assume that the correcting coefficients and pulse widths of the eight pulses are respectively Pn, Tn (n=0 through 7), counting from the reference pulses. Tn is input from the period detecting means 601, and eight pulse widths from T0 to T7 are added by the adding means 609. On the other hand, the input eight pulse width data are stored in the storing means 610. The division between eight pulse widths Tn respectively stored in the storing means 610 and the addition data of the adding means 609 are effected by the dividing means 611 so as to output a correcting coefficient Pn.

A correcting coefficient Pn in a formula is as follows.

$$Pn = Tn \times 8/(T0+T1+T2+T3+T4+T5+T6+T7)$$

The correcting coefficient Pn obtained by the above described formula is output to the correction coefficient storing means 604 of FIG. 2. Whether the set values of the reference pulse and the correction coefficient (not shown in FIG. 1 and FIG. 2) are output to the pulse number detecting means 603 and the correcting coefficient storing means 604 is adapted to be controlled from the outside so as to output a set value if necessary, for example, at the initial setting time when the gas meter starts to be used, it is effected with respect to the pulse number detecting means 603 and the correction coefficient storing means 604. In FIG. 2, the pulse number detecting means 603 is composed of a counter circuit for counting the eight pulses. The above described counter circuit is cleared by the signals from the period detecting means 601. Accordingly, the count value of the pulse number detecting means 603 is 0 at a data time point hen the reference pulse has been input. Whenever a pulse is input, the count value is increased one count by one count. The count value restores to 0 when the pulses are input to the next of 7. Namely, whenever the pulse is input, the count value changes as follows.

0 1 2 3 4 5 6 7 0 1 2

Accordingly, the reference pulse is a pulse of 0 number. The number of the pulse counted from the reference pulse can be known from the pulse to be input at the present time by a pulse number detecting means 603. Whenever the pulse is input from the comparator 4, the pulse number detecting means 603 outputs the pulse number of the input pulse to the next stage of the correcting coefficient storing means 604. The correcting coefficient storing means 604 outputs the correcting coefficient corresponding to the pulse number whenever the pulse number information is input.

In the above described construction, the flow amount measuring apparatus functions automatically to correct the inequality of the pulse signal interval from the comparator 4 which is caused by the characteristics of the film type gas meter, so that a correct and highly resolved integration display and a correct momentary flow amount measuring operation can be realized, with an effect improving a safety processing function.

Although the period detecting means 601 is described in the embodiments of FIG. 2 and FIG. 3 so that it may be operated only at the initial setting time, it may be adapted to operate, reset regularly, for example, once per day.

In the present embodiment, although the pulse number detecting means 603 outputs the corresponding pulse number each time the pulse inputs at a time point when the pulse has been input after the passage of one second after the former pulse number has been output, the collectively input pulse numbers can be output so that each correcting processing operation may be effected in approximately one second.

The operation of the momentary flow amount computing means 7 in FIG. 1 will be described hereinafter. One second after from inputting of the pulse 0 signal from the pulse interval correcting means 6, the time and the pulse number between pulse 0 and pulse N are measured hereinafter. The momentary flow amount Q is obtained by $Q=N/T$, here, where N is the pulse number and T is the time between pulse 0 and pulse N. The momentary flow amount Q is equal to 0 when pulses are not input for ten seconds, for example.

Figure 5:
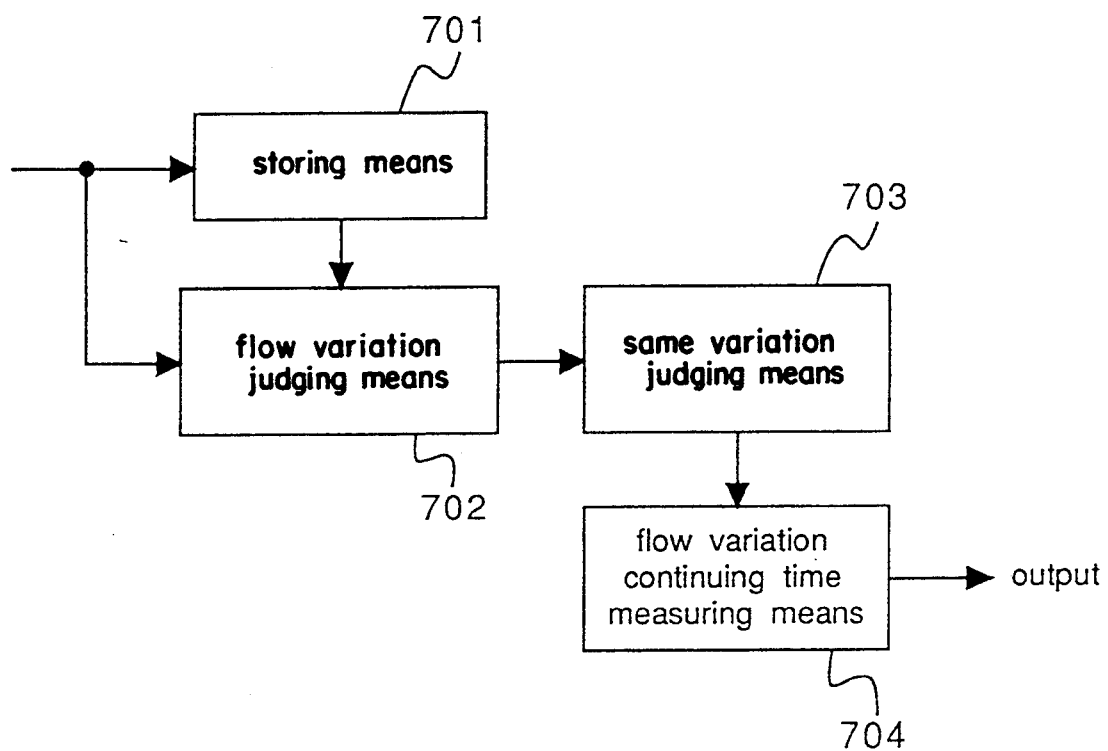
FIG. 5 is a block diagram of a flow amount change detecting means which is another element of a flow amount measuring apparatus of the present invention.

The operation of the flow amount change detecting means 8 in FIG. 1 is described hereinafter. FIG. 5 is a block diagram showing the construction of a flow variation detecting means 8. Generally the flow amount variation at the ignition time of the gas appliance and the flow amount variation at extinction time are changed momentarily. The gas hot water feeding machine controls the gas combustion amount electronically so that the outputted hot water temperature is made constant at a set temperature. In such a case, the flow amount changes slowly for a long period of time. The flow amount variation detecting means 8 detects the pattern of this change so as to detect the length of the continuous change of one gas appliance. In FIG. 5, reference numeral 701 is a storing means for sequentially storing the flow amount output from the momentary flow amount computing means 7; reference numeral 702 is a gas flow variation judging means which judges whether or not the gas flow amount variation $Q_i - Q_{i-1}$ is more than a previously fixed threshold value, for example, $0.03 \times Q_i$, wherein $Q_i$ is a present momentary flow amount and $Q_{i-1}$ is the previous value thereof.

Figure 6:
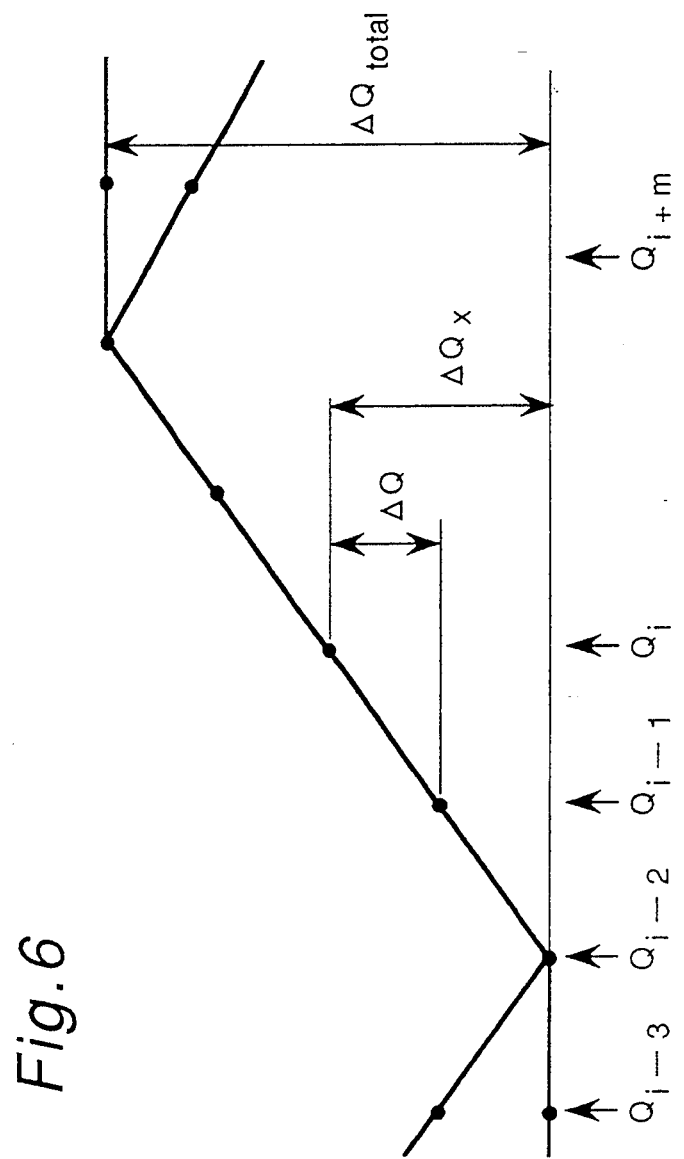
FIG. 6 is a flow amount change diagram for illustrating the operation of the above described flow amount change detecting means.
Figure 7:
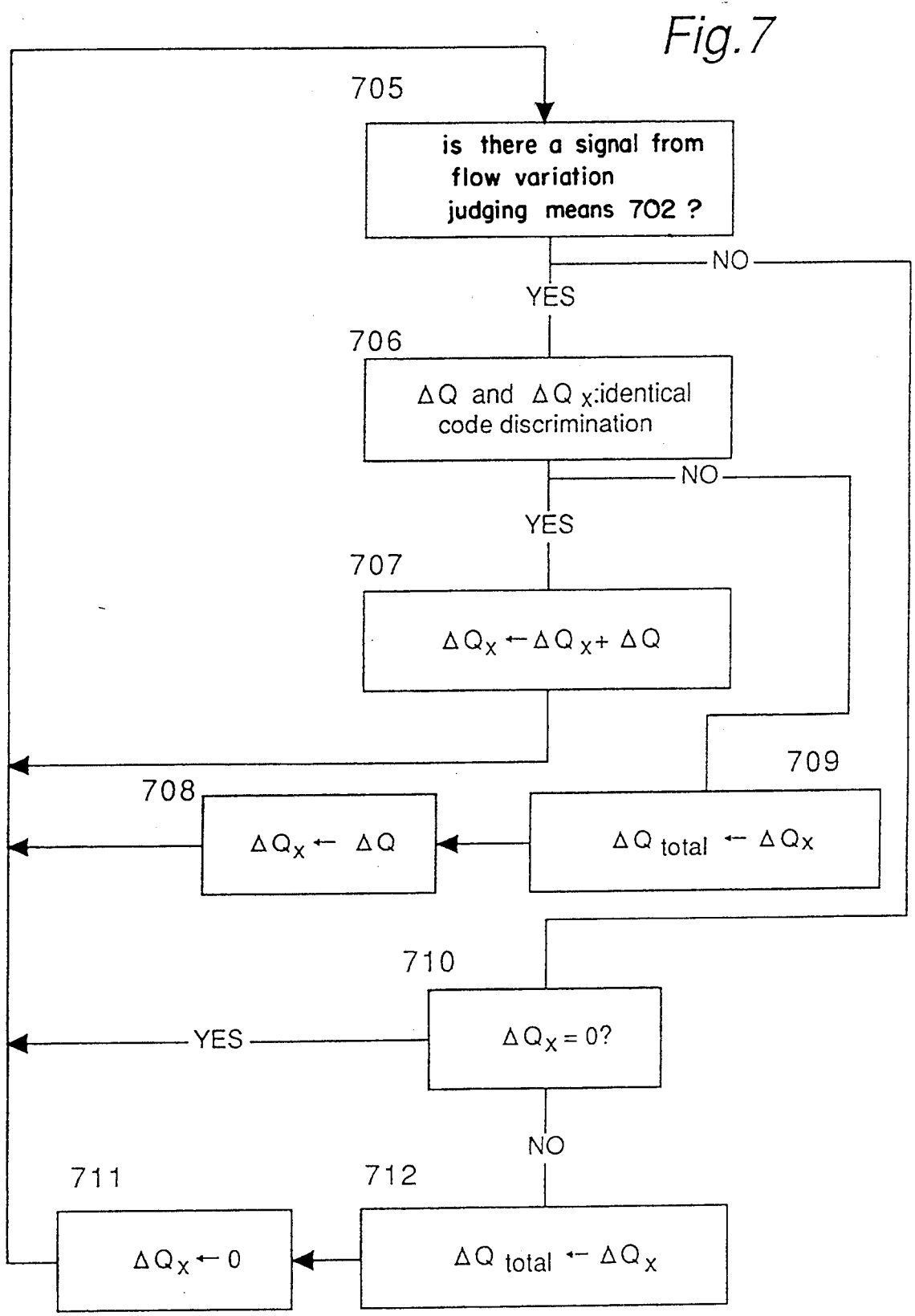
FIG. 7 is a flowchart for illustrating the above described flow amount change detecting means.

A same variation judging means 703 judges whether or not the previous flow amount variation and the present flow amount variation are a series of changes of the same gas appliance or a change in another gas appliance from the variation judging result by the above description flow variation judging means 702. A conception chart of the same change judging method in the same variation judging means 703 is shown in FIG. 6, and a flowchart for illustrating the concrete operation of the same variation judging means 703 is shown in FIG. 7. The operation of the same variation judging means 703 is described hereinafter. In FIG. 6, $Q_i$ is a present momentary flow amount, Qi-1 is a momentary flow amount one interval before; Qi-2 and Qi-3 are respectively momentary flow amounts two and three intervals before Qi; Qi+m is a momentary flow amount value m intervals after Qi; $\Delta Q = Qi - Qi - i$ and $\Delta Qx$ are present integration values of the same flow amount variation; and $\Delta Q_{total}$ is an overall integration value in the same flow amount variation.

In the example of FIG. 6, the momentary flow amount value two intervals before and the momentary flow amount three intervals before do not change or the flow amount reduces. The flow amount increases from the momentary flow amount value two intervals before Qi to the monetary flow amount value m intervals after Qi. At the time of interval m and its subsequent intervals, the flow amount variation is not provided or the flow amount variation turns into a decreasing variation. In the same variation judging means 703, as shown in FIG. 6, the variation flow amount $Q_{total}$ at a time point when the flow amount has been changed from a condition where the flow amount variations are not effected, or a time point when the flow amount has not been changed from Qi-2 at a time point when the reverse flow amount variation has been effected, or to $Q_{itm}$ at a time point wherein the flow amount has been turned into inverse flow amount variations are judged as one flow amount variation. The $\Delta Q_{total}$ is output as an output C into the next stage of individual flow amount estimating means 9.

The detailed operation of the above described same variation judging means 703 will be described hereinafter in accordance with the flowchart of FIG. 7. At a step 705, a determination is made as to whether or not the flow amount variation signal $\Delta Q$ exists from the flow variation judging means 702. If the flow amount variation signal $\Delta Q$ exists, in step 705, a determination is made as to whether or not $\Delta Q$ and $\Delta Qx$ which is an integrated value of the same flow amount variation are the same code (the same code in a case of $\Delta Q > 0$ and $\Delta Qx > 0$, or $\Delta Q < 0$ and $\Delta Qx < 0$). If $\Delta Q$ and $\Delta Qx$ are the same codes or $\Delta Qx$ is 0, $\Delta Q$ is added to $\Delta Qx$ as the same variation in step 707. If the $\Delta Q$ and $\Delta Qx$ are not the same codes, the reverse variations are caused. After the $\Delta Q_{total}$ has been replaced by $\Delta Qx$ in step 709, $\Delta Qx$ is replaced by $\Delta Q$ as a new variation step 708. If it is judged that the flow amount variation signal $\Delta Q$ does not exist from the flow variation judging means 702 in step 705, a judgement is made as to whether or not $\Delta Qx$ is zero in step 710. $\Delta Qx$ is zero means that the flow amount variation has not been effected up to the last time. Since the flow amount variation does not exist at this time, the operation returns to step 705 for the next flow amount variation judgment without doing anything. If there is no signal from the flow variation judging means 702 and $\Delta Qx$ is not zero at step 710, it means that the last series of variations has been completed, and $\Delta Qx$ is replaced by zero at step 711 after $\Delta Q_{total}$ has been replaced by $\Delta Qx$ in step 12. In step 709 and step 712, the signal $\Delta Q$ total is outputted as the output C.

The operation of the flow amount variation continuing time measuring means 704 is described hereinafter. As described hereinabove, when the gas hot water feeding apparatus changes the momentary gas flow amount with the electronic control, the flow amount variation is often slow. When gas appliances such as a gas fan heater or the like are extinguished or ignited, the change of the falling or rising gas flow amount is steep. In order to find out which gas appliance has made gas flow amount change using the characteristics of gas flow amount variation the time of the flow amount variation is continuously measured. When the start of the flow amount variation is detected in the same variation judging means 703, a signal indicating the start of the flow amount variation is transmitted to the flow amount variation continuing time measuring means 704. When it is confirmed that the flow amount variation has been completed from the same variation judging means 703, a signal indicating the flow amount variation completion is transmitted to the flow amount variation continuing time measuring means 704. The time from the start to the completion of the flow amount variation is measured as $\Delta T$ and is output as the output D to the next stage of the individual flow amount estimating means 9.

Figure 8:
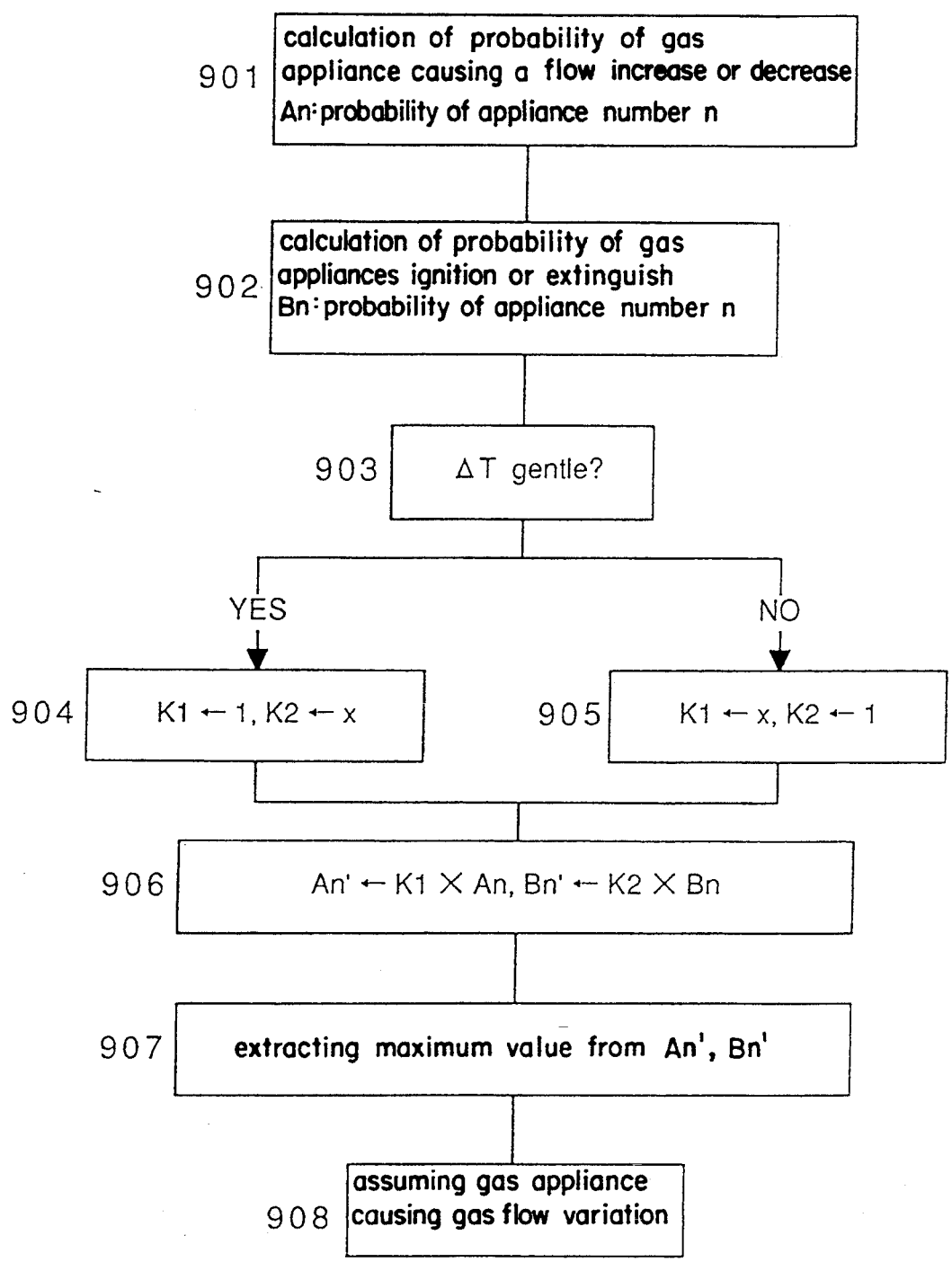
FIG. 8 is a flowchart showing the operation of an individual flow amount estimating means.

The operation of the individual flow amount estimating means 9 is described hereinafter. Using two pieces of information of the size $\Delta Q_{total}$ from the flow variation detecting means 8 and the flow variation continuing time $\Delta T$, the gas appliance causing the flow variations is determined. The flow chart for illustrating the operation of the individual flow amount estimating means 9 is shown in FIG. 8. The probability of which gas appliance caused the gas flow variation of $\Delta Q_{total}$ is computed in steps 901 and 902. In step 901, the probability of a particular gas appliance increasing or decreasing the gas flow amount is computed and stored in a register An. Here an additional character n is a register number, which is an identification number of a corresponding gas appliance. In step 902, the probability of the ignition or the extinction of the gas appliance is computed, and the result is stored in register Bn. In step 903, a determination is made as to whether the flow variation is gentle or steep using the flow variation continuing time $\Delta T$. If the change is gentle, in step 904, coefficients $K1 = 1$, $K2 = x$ (previously determined constant of $x < 1$). If the change is steep in step 903, coefficients $K1 = x$, $K2 = 1$ are established in step 905. In step 906, the probability of flow variations of the respective gas appliances computed in step 901 and step 902 are corrected by the coefficients K1 and K2. Namely, the probability An is multiplied by the coefficient $K_1$ and stored in register An'. The probability Bn is multiplied by the coefficient K2 and stored in register Bn'. When the flow variation is gentle, the probability of the ignition or the extinction of the gas appliance becomes smaller, and the probability of such a flow amount increase or decrease as of the hot water feeding machine and so on which have electronic control becomes larger in value. In step 907, the largest value in the register An' and Bn' is selected. In step 908, the gas appliance number n of the appliance which presumably caused gas flow variation is assumed. Accordingly, in the case of the example shown in FIG. 6, the possibility of the gentle flow variation by the proportional control hot water feeding device is calculated to be larger than the possibility of flow variations by the gas fan heater extinction. As a result, it is estimated that the gas flow amount of the hot water feeding device is decreased. FIG. 9 shows a block diagram showing the construction of the individual flow amount estimating means 9. Reference numeral 909 is a means for computing the probability that a gas appliance has caused a gas flow increase or decrease; reference numeral 910 is a means for computing the probability that a gas appliance has been ignited or extinguished; reference numeral 911 is a probability correcting means; reference numeral 912 is an individual flow amount memory storage means for each gas appliance; reference numeral 913 is a comparing means which compares the probability of the gas appliance which made gas flow change with above mentioned data. In the various probability computing means 909, 910, and 911, the probabilities of the flow variations are computed for each of the gas appliances using size of the variation amounts from the flow variation detecting means, the continuous time of the variation amounts, the characteristics of the retained appliance register means 10, and the flow amount value to be used at the present time for each of the gas appliances from the individual flow amount memory storage means 912. The probability computing method has functions as shown in FIGS. 10(1)-10(3). In FIGS. 10(1) and 10(2), Qsn is a gas flow amount at an ignition time of an appliance number n stored in the retained appliance registering means 10, Qkn is a flow amount of a gas appliance which is stored in the individual appliance flow amount storing means 912, and ΔQ is a flow variation from the flow variation detecting means 8. The function in FIGS. 10(1)-10(3) can be set under the adjustable gas flow amount value range of the gas appliance. In FIG. 10(1) Ptum is a function for obtaining the probability of the ignition, Pln in FIG. 10(2) is a function for obtaining the probability of the flow variation of the gas appliance during use, Pman in FIG. 10(3) is a function for obtaining the probability of extinction of the appliance during use. The value of the probability obtained from each function of FIGS. 10(1)-10(3) is corrected by the way described in the flow chart of FIG. 8 using the information from the flow variation detecting means 8. The flow amount value is considered to change by the pressure variation and so on of the gas piping even if the change is not in the gas appliance. The probability correcting means 911 can compute, the probability of the flow variation except in the gas appliance. The comparing means 913, outputs the information of the gas appliance number n and its flow amount which possibly made the largest gas flow variation, as the output E. In the individual flow amount memory storage means 912, a flow variation amount ΔQ is added to the individual flow amount value of the gas appliance estimated by the comparing means 913 and is stored as the new individual flow value.

Figure 11:
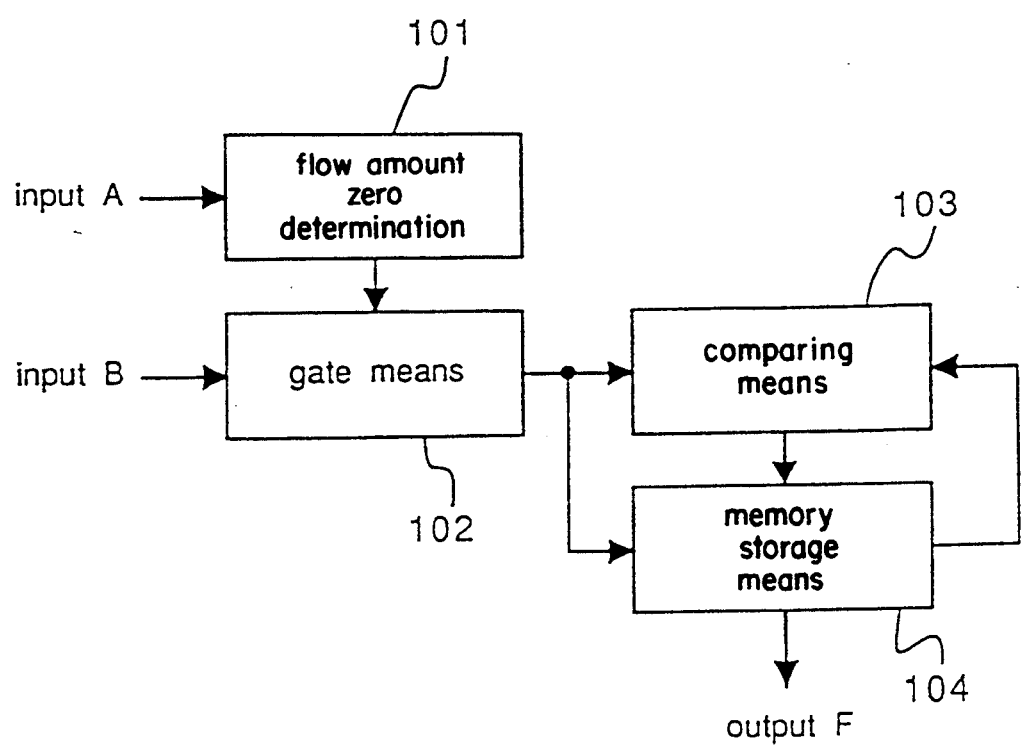
FIG. 11 is a block diagram of a retaining appliance registering means which includes other elements of a flow amount measuring apparatus of the present invention.

The construction about the retained appliance register means 10 is described hereinafter with reference to FIG. 11. In FIG. 11, reference numeral 101 is a flow amount zero determination means; reference numeral 102 is a gate means; reference numeral 103 is a comparing means, and reference numeral 104 is a memory storage means. Signals from the momentary flow amount computing means 7 are inputted as input A. Signals from the flow variation detecting means 8 are inputted as input B. The flow amount zero determination means 101 determines whether or not the flow amount is zero, namely whether or not a gas appliance is used. The flow amount zero determination means 101 is arranged so that an output is caused if the gas appliance is not used. Assume that a gas fan heater of 3000 kcal / h is used in a condition where no other gas appliance is used. The output of the momentary flow amount computing means 7 is changed to 3000 kcal / h from zero and a signal equivalent to 3000 kcal / h is outputted to the flow variation detecting means 8. The flow amount zero determination means 101 outputs a signal since first the gas appliance is not used. When the gas fan heater is used, it is switched to no signal. The switching time to a no signal is delayed as compared with the output signal from the flow variation detecting means 8. The gate means 102 transmits the signal of the flow variation detecting means 8 to the comparing means 103 only when the flow amount zero determination means 101 is outputting a signal. Since switching the signal from the flow amount zero determination means 101 to no signal is delayed in time as compared with the output of the flow variation detecting means 8, the output of the flow variation detecting means 8 is inputted to the comparing means 103 through the gate means 102. In the comparing means 103, a signal stored in the memory storing means 104 is compared with a signal corresponding to 3000 kcal / h from the flow variation detecting means 8. Unless the signal corresponding to 3000 kcal / h has been stored in the storing means 104, the output from the comparing means 103 causes the storage of the signal corresponding to the 3000 kcal / h in the storing means 104. Then, assume that the gas fan heater of 3000 kcal / h is used in a condition where the hot water feeding device is being used. In this case, the flow amount zero determination means 101 outputs no signal from the beginning. Therefore, the gate means 102 does not convey to the comparing means 103 the signal of the flow variation detecting means 8. Therefore, the comparing means 103 and the memory storing means 04 do not operate. In the above described construction, the retained appliance register means 10 stores the gas flow amount correspond to a gas appliance automatically through the comparing means 103 and the memory storing means 104 only when a certain gas appliance is used from a condition where no other gas appliance is being used, with an effect that the bother of the registration of the new gas appliance is unnecessary.

According to the present invention, an assumption can be made as to the gas appliance which made the flow variation by the information such as the gas flow amount rising characteristics and the gas flow amount adjusting range or the like from the individual flow amount estimating means 9. By the correct estimation of the used gas flow amount of the gas appliance, the abnormal use of the gas can be judged correctly by the safety control means 11 and a gas explosion and fire can be prevented. Also, the rate policy for each appliance can be effected by the integration of the used gas flow amount for each gas appliance by the integrating means 12 for each gas appliance.

The flow amount measuring and controlling apparatus of the present invention can be realized easily using microcomputers.

Although the present invention has been fully described by way of example with reference to the accompanying drawings, it is to be noted here that various changes and modifications will be apparent to those skilled in the art. Therefore, unless such changes and modifications otherwise depart from the scope of the present invention, they should be construed as being included therein.

What is claimed is:

1. An apparatus for measuring and controlling the amount of flow of a fluid comprising;
  a momentary amount of flow computing means for computing the amount of flow per unit time of the fluid;

an amount of flow change detecting means for detecting and outputting the amount of flow change and the time from the start of the amount of flow change to the completion thereof in accordance with the time change characteristics of the computed amount of flow per unit time of the fluid;

a retained appliance register means for storing the characteristics of the amount of flow change of each of a plurality of appliances;

an individual amount of flow estimating means for estimating the appliance whose amount of flow has changed using the amount of flow change information from the amount of flow change detecting means and the amount of flow change characteristics of the appliance stored in the retained appliance register means, and an individual amount of flow controlling means for controlling the amount of flow of each appliance separately in accordance with the signal from the individual amount of flow estimating means.

2. An apparatus as recited in claim 1, wherein said individual amount of flow controlling means cuts off the supply of the fluid when a certain appliance has been used beyond a predetermined maximum time of continuous use and wherein said maximum time is individually set for each appliance.

3. An apparatus as recited in claim 1, wherein said individual amount of flow controlling means includes an integrating means and a display means for determining and for displaying an integrated value of the amount of flow of at least a predetermined specific appliance.

4. An apparatus as recited in claim 1, wherein said individual amount of flow controlling means includes a communication means for externally transmitting an integrated value of the amount of flow of at least a predetermined specific appliance.

5. An apparatus as recited in claim 11, wherein said individual amount of flow change detecting means comprises a memory storing means for storing signals from said momentary amount of flow computing means, and a same change judging means for detecting and outputting a starting time point and a completion time point of the amount of flow change using a past momentary amount of flow change value stored in said memory storing means and a present momentary amount of flow value from said momentary amount of flow computing means.

6. An apparatus as recited in claim 5, wherein said same change judging means judges that the change value is the same up to a time when the difference between a previous momentary amount of flow stored in said memory storing means and a present momentary amount of flow is determined to be no greater than a predetermined value during certain predetermined times.

7. An apparatus as recited in claim 5, wherein said same change judging means judges that the change value is the same, up to one of a time when the difference between a previous momentary amount of flow stored in said memory storing means and a present momentary amount of flow is determined to be no greater than a predetermined value during certain predetermined times and a time when the difference between the previous amount of flow stored in said memory storing means and the present momentary amount of flow is determined to be at least equal to a certain value and a direction of change of the amount of flow change is reversed.

8. An apparatus as recited in claim 1, wherein said amount of flow change detecting means comprises:

a memory storing means for storing signals from said momentary amount of flow computing means;

a same change judging means for detecting and outputting a starting time point and a completion time point of an amount of flow change by comparing a past momentary amount of flow change stored in said memory storing means and a present momentary amount of flow from said momentary amount of flow computing means, and an amount of flow change continuous time measuring means for measuring a continuous time of a single amount of flow change detected by said same change judging means.

9. An apparatus as recited in claim 1, wherein said retained appliance register means comprises:

an amount of flow zero judging means for judging whether an amount of flow is zero by an input signal from said momentary amount of flow detecting means;

a gate means for determining if signals from said amount of flow change detecting means are to be transmitted to a next stage in accordance with an output from said amount of flow zero judging means;

a memory storing means connected to said gate means to store an amount of flow value at ignition time of an appliance, and a comparing means for outputting a signal to control said memory storing means so that a signal from said gate means is stored in said memory storing means if said signal from said gate means fails to be in agreement with a signal from said memory storing means through a comparison between these two signals.

10. An apparatus as recited in claim 1, wherein said individual amount of flow estimating means comprises:

an individual amount of flow storing means for storing an amount of flow value of each appliance in use at the present time;

a possibility computing means for computing the possibility of the appliance which made the amount of flow change by a predetermined function using the change amount of flow and the continuous time information of the amount of flow change from said amount of flow change detecting means, and the amount of flow at ignition time stored in said retained appliance register means, and the amount of flow during the use of each appliance stored in said individual amount of flow storing means, and a comparing means for comparing the possibilities of each appliance computed by said possibility computing means and for determining the appliance having a maximum possibility of it causing the amount of flow change.

11. An apparatus as recited in claim 10, wherein said possibility computing means comprises:

a computing means for computing possibility of an amount of flow increase or decrease of the appliance in use at present;

a computing means for computing the possibility of the ignition of an appliance not in use at present and of the extinction of an appliance in use at present; and a computing means for computing the need for correcting an amount of flow value of each appliance during use.

12. An apparatus for measuring and controlling the amount of flow of a fluid comprising:

an amount of flow detecting means for outputting a plurality of pulses for one rotation or one round trip of a mechanical type movable portion thereof which corresponds to a certain constant volume of fluid flow;

a pulse interval correcting means for amending time intervals between said plurality of pulses into equal time intervals with respect to an equal amount of flow in accordance with characteristics of said plurality of pulses output from said flow detecting means; and an instant flow amount calculating and controlling means for calculating and controlling an instant flow amount value in accordance with said time intervals of said plurality of pulses which have been amended by said pulse interval correcting means.

13. An apparatus as recited in claim 12, wherein said pulse interval correcting means comprises:

a period detecting means for detecting a reference signal of a period of one rotation or one round trip of the mechanical type movable portion;

a pulse detecting means for counting the number of pulses from the reference signal detected by said period detecting means so as to thereby count the number of output signals of the amount of flow detecting means;

a correcting coefficient storing means for storing the correction coefficients for correcting an amount of flow value corresponding to the signal from the amount of flow detecting means so as to output the correction coefficient stored in accordance with the signal from the pulse detecting means; and a correction coefficient computing means for computing the correction coefficients by the signal from the period detecting means and for outputting the correction coefficients to the correction coefficient storing means.

14. An apparatus as recited in claim 13, wherein said period detecting means comprises:

a pulse width measuring means for measuring a pulse width from the signal of the amount of flow detecting means;

a pulse width storing means for storing the pulse width measured by said pulse width measuring means;

a comparing means for comparing the pulse width information from said pulse width measuring means with the pulse width information stored in said pulse width storing means;

an operating means for computing a correction coefficient of the pulse width by the information from said pulse width storing means, and a steady state condition judging means for judging whether or not the flow is in a steady state condition by the signal from a rotation detecting means, and for outputting a controlling signal so that said comparing means and said operating means are operated in the steady state condition of the amount of flow.

15. An apparatus as recited in claim 13, wherein said correction coefficient computing means comprises:

a storing means for storing the length of each pulse of one period from said period detecting means;

an adding means for adding each length of one period from said period detecting means;

and a dividing means for computing the ratio of an addition value stored in said adding means and the length of each pulse stored in said storing means.

* * * * *